United States Patent
Parampottil et al.

(10) Patent No.: US 11,659,137 B1
(45) Date of Patent: May 23, 2023

(54) VIDEO DISPLAY BLURRING ON DEMAND

(71) Applicant: Securus Technologies, LLC, Carrollton, TX (US)

(72) Inventors: Isaac Parampottil, Coppell, TX (US); Amit Kumar Shrivastava, Montréal (CA)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 17/106,601

(22) Filed: Nov. 30, 2020

(51) Int. Cl.
| | |
|---|---|
| *H04N 7/14* | (2006.01) |
| *G06F 3/0488* | (2022.01) |
| *G06T 5/00* | (2006.01) |
| *G06T 7/11* | (2017.01) |
| *G06T 7/194* | (2017.01) |
| *G06T 5/50* | (2006.01) |

(52) U.S. Cl.
CPC .......... *H04N 7/147* (2013.01); *G06F 3/0488* (2013.01); *G06T 5/004* (2013.01); *G06T 5/50* (2013.01); *G06T 7/11* (2017.01); *G06T 7/194* (2017.01); *G06T 2207/10016* (2013.01)

(58) Field of Classification Search
CPC .... H04N 7/14; G06T 5/00; G06T 5/50; G06T 7/11; G06T 7/184; G06F 3/0488
USPC .......................................... 348/14.01–14.16
See application file for complete search history.

(56) References Cited

U.S. PATENT DOCUMENTS

| | | | | |
|---|---|---|---|---|
| 9,083,850 | B1* | 7/2015 | Higgs | H04N 7/147 |
| 9,106,789 | B1* | 8/2015 | Shipman, Jr. | H04N 7/15 |
| 10,674,114 | B1* | 6/2020 | McQueen | H04L 65/762 |
| 2008/0259154 | A1* | 10/2008 | Garrison | H04N 7/14 |
| | | | | 348/14.01 |
| 2015/0229882 | A1* | 8/2015 | Liu | H04N 7/15 |
| | | | | 348/14.08 |
| 2016/0155216 | A1* | 6/2016 | Yoon | G06T 5/20 |
| | | | | 382/264 |
| 2016/0260201 | A1* | 9/2016 | Liu | H04N 7/15 |
| 2018/0365809 | A1* | 12/2018 | Cutler | G06T 7/50 |
| 2020/0169674 | A1* | 5/2020 | Hanahara | H04N 5/23219 |

* cited by examiner

*Primary Examiner* — Melur Ramakrishnaiah
(74) *Attorney, Agent, or Firm* — Fogarty LLP

(57) ABSTRACT

Systems and methods for managing displays on video communication devices are disclosed. A video communication session is established to a remote device. A video signal is received from the remote device. Images from the video signal are shown on the display. A blur command is received from a user of the video communication device or automatically based on a set of rules. At least a portion of the images on the display are blurred in response to the blur command. The blurring may comprise, blurring one or more objects in a background of the images, blurring one or more faces in the images, and/or blurring static background objects in the images.

20 Claims, 7 Drawing Sheets

VIDEO DISPLAY BLURRING ON DEMAND

BACKGROUND

Correctional facilities, such as prisons and jails, or other controlled-environment facilities usually allow residents (i.e., inmates or prisoners) to communicate with family, friends, attorneys, and others outside the facility to allow the residents to maintain personal connections and to facilitate their transition back into society upon release. Many controlled-environment facilities allow some form of video visitation or video calling for such communications. Video services may be provided in housing and common areas using fixed kiosks or portable tablet computers, for example. However, the introduction of cameras in a controlled-environment facility may expose more than just the calling resident to outside parties. There are potential security concerns with inmates viewing friends and families of other inmates. For example, each party participating in a video communication may see background details and other individuals behind the other party on the communication. Additionally, uninvited residents may be able to see and hear the outside parties, such as a resident's friends, family, or attorney, during video communications that are conducted by other residents.

Previous methods resolved these issues by placing or restricting video terminals outside of the general inmate living areas, such as by using dedicated video visitation rooms. This is undesirable as it negates one of the prime advantages of video visitations; namely, to provide visitations without having the security and administrative issues associated with moving inmates from housing locations to visitation locations. An alternative solution is to design the housing units in such a way that the video terminals face an unoccupied area. This is impractical since such floor plan designs would tend to rely on designing private areas to house the video terminals, but such areas are difficult for correctional officers to monitor and thereby provide locations for violent and/or illicit activities to take place.

SUMMARY

In an example embodiment, a method for managing a display on a video communication device comprises establishing a video communication session to a remote device, receiving a video signal from the remote device, showing images from the video signal on the display, receiving a blur command from a user of the video communication device, and blurring at least a portion of the images on the display. The blurring of at least a portion of the images may comprise, for example, blurring one or more objects in a background of the images, blurring one or more faces in the images, and/or blurring static background objects in the images.

The blur command may be entered by the user of the video communication device using a physical button on the video communication device. The blur command may be entered by the user of the video communication device using a button displayed on a touchscreen display on the video communication device. The blur command may be triggered automatically based on the content of the display and/or the events surrounding the user of the video communication device. Alternatively, there may be a verbal command by either participant to trigger blurring.

The method may further comprise stopping the blurring of the at least a portion of the images after a predetermined duration.

The method may further comprise receiving a stop-blur command from the user of the video communication device and stopping the blurring of the at least a portion of the images in response to the stop-blur command.

The method may further comprise receiving a blur command from the remote device and blurring at least a portion of the images on the display in response to the blur command from the remote device.

The method may further comprise sending a blur request to the remote device, wherein the blur request causes the remote device to adjust a depth of field parameter for the video signal, such that images of a first object at a first distance from the remote device are in focus and images of a second object at a second distance from the remote device are blurred.

In another embodiment, a system comprises a video communication device configured to receive video data from a remote device, a screen configured to display the received video data, a data storage device coupled to the video communication device and configured to store the received video data, and a data processor configured to modify at least a portion of received video data so that an image represented by the received video data is blurred when displayed on the screen.

The video communication device may be located in a secure environment, and the remote device may be located outside the secure environment.

The data processor may be configured to modify the received video data upon receiving a blur command from a user of the video communication device.

The data processor may be configured, for example, to modify at least a portion of the image by blurring one or more objects in a background of the image, to modify at least a portion of the image by blurring one or more faces in the image, and/or to modify at least a portion of the image by blurring static background objects in the image.

The data processor may be further configured, for example, to stop blurring of the at least a portion of the image after a predetermined duration, to receive a stop-blur command from a user of the video communication device and to stop blurring of the at least a portion of the image in response to the stop-blur command, and/or to receive a blur command from the remote device and to blur at least a portion of the image on the display in response to the blur command from the remote device.

The system may further comprise a transmitter configured to send a blur request to the remote device, wherein the blur request causes the remote device to adjust a depth of field parameter for the video signal, such that image(s) of a first object at a first distance from the remote device are in focus and image(s) of a second object at a second distance from the remote device are blurred.

BRIEF DESCRIPTION OF THE DRAWINGS

Figure 1:
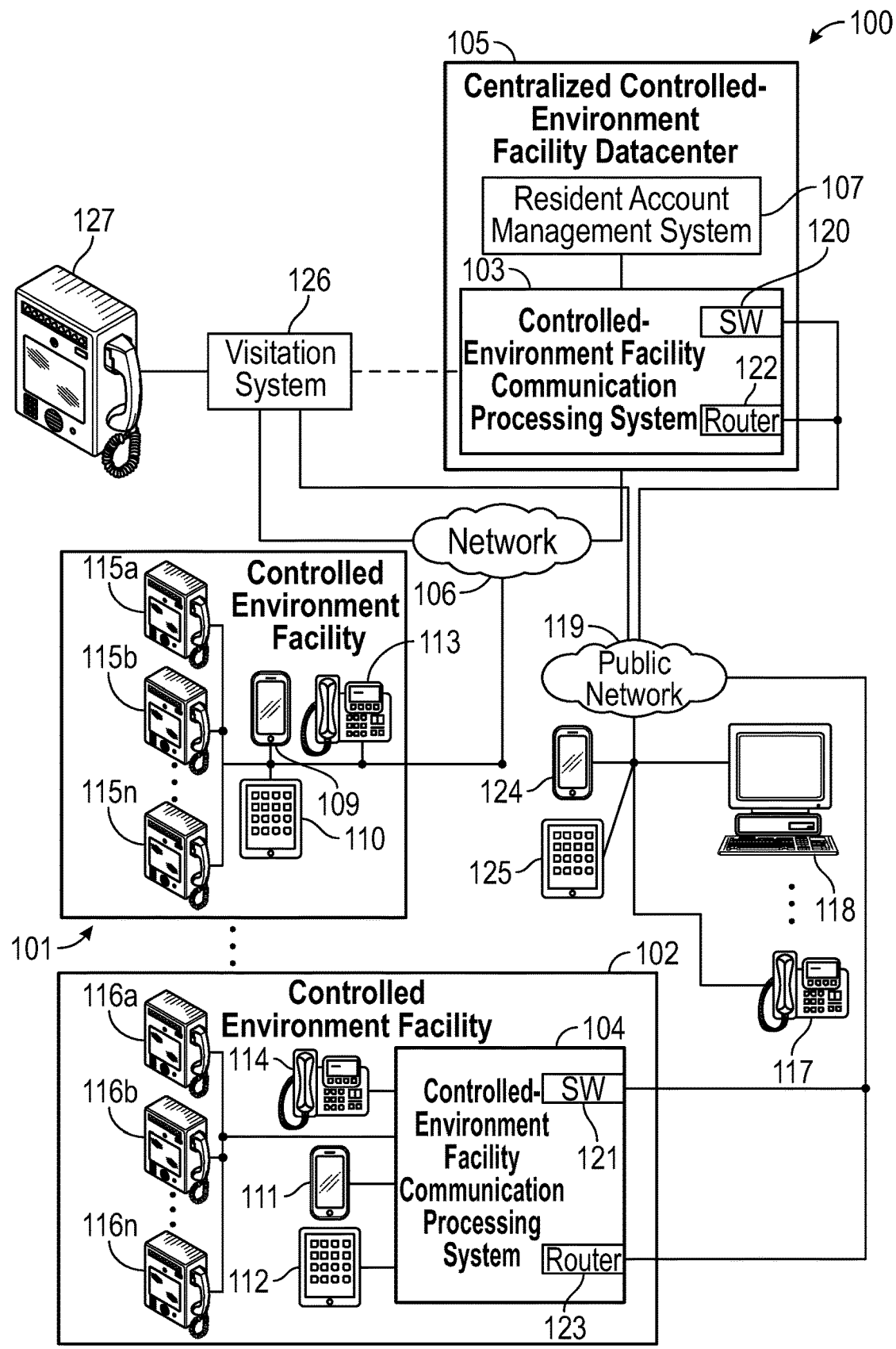

Having thus described the invention in general terms, reference will now be made to the accompanying drawings, which are not necessarily drawn to scale, and wherein:

FIG. 1 is a diagram of an example controlled-environment facility environment, wherein embodiments of systems and methods for managing the content of video visitation display screens may be deployed as described herein.

Figure 2:
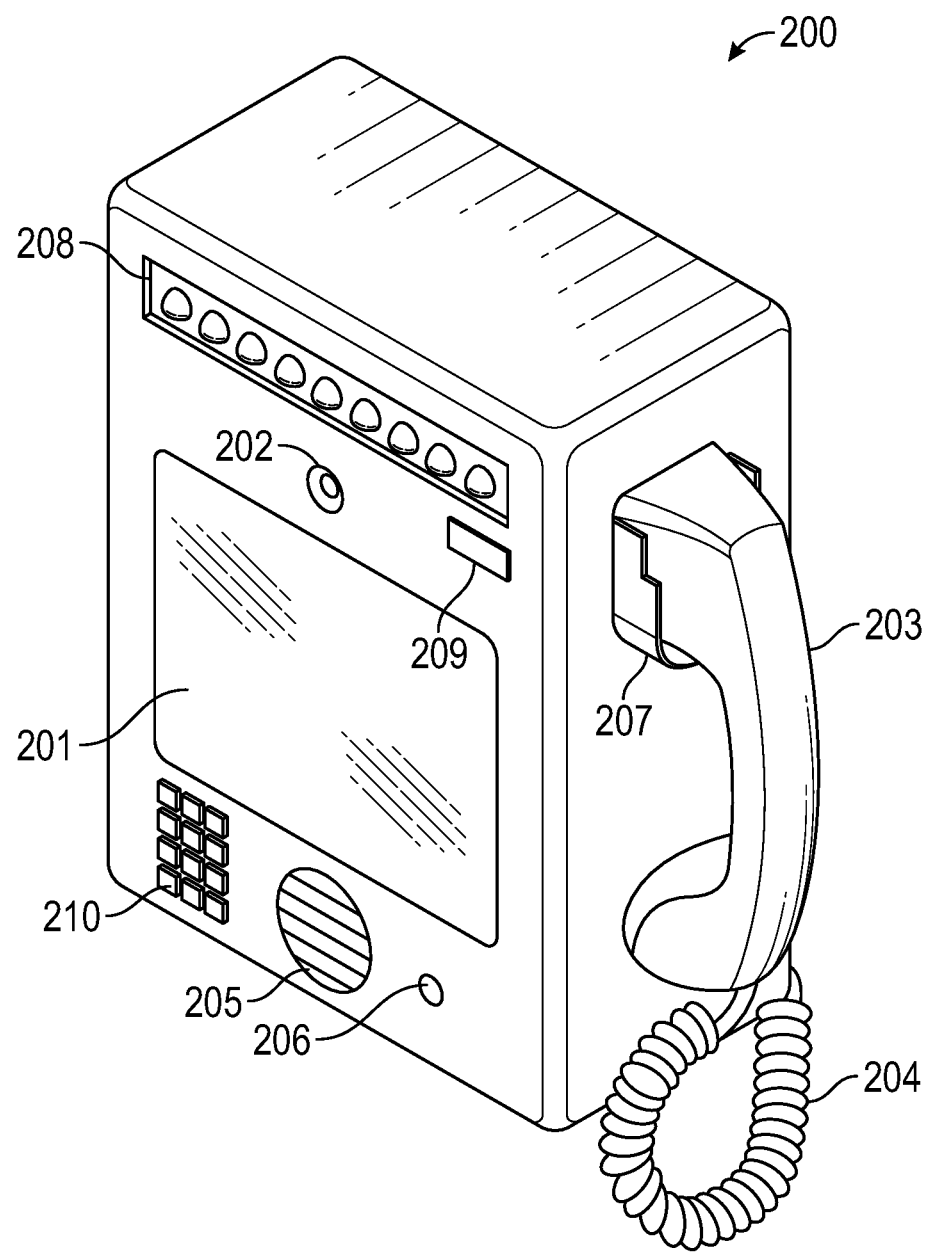

FIG. 2 illustrates an example video visitation device, such as an Intelligent Facility Device.

Figure 3:
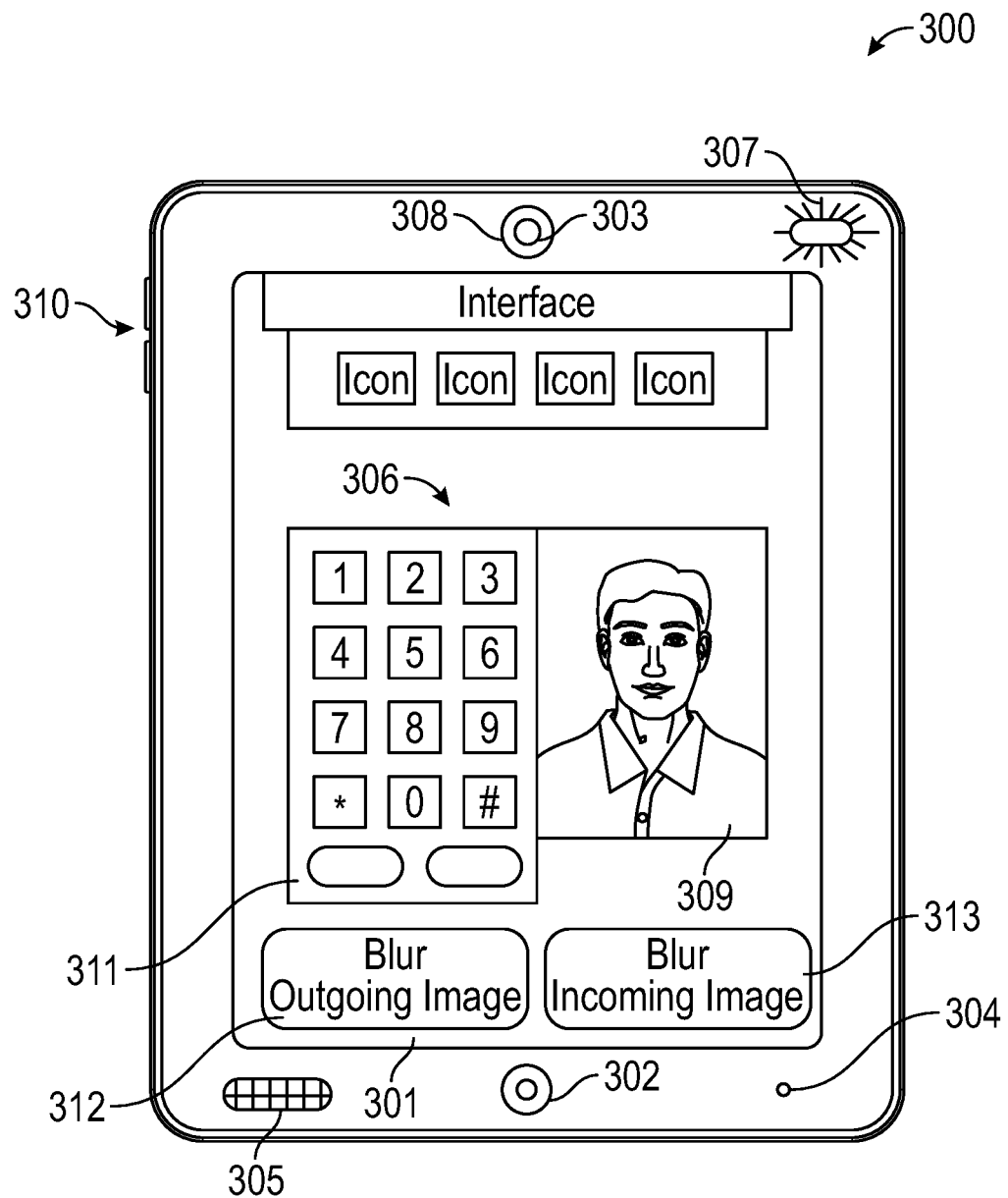

FIG. 3 illustrates an example video visitation device, such as a mobile or portable Intelligent Resident Device/Intelligent Inmate Device.

Figure 4:
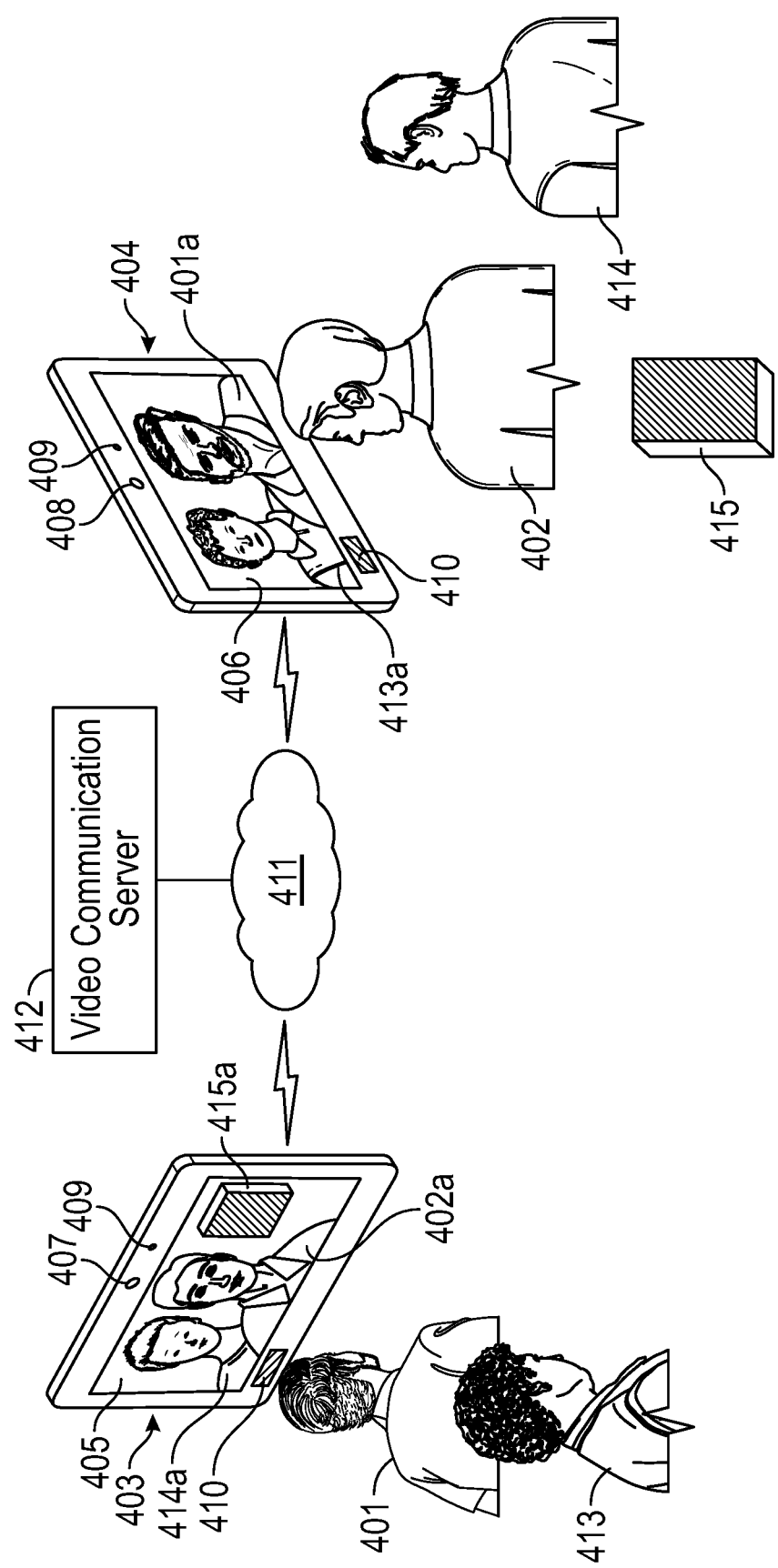

FIG. 4 is simplified block diagram illustrating two individuals participating in a video communication session.

Figure 5A:
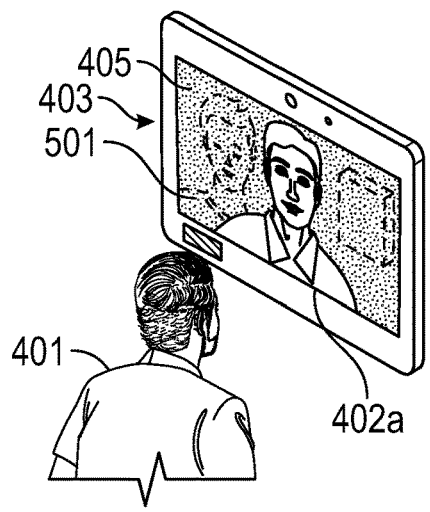
Figure 5B:
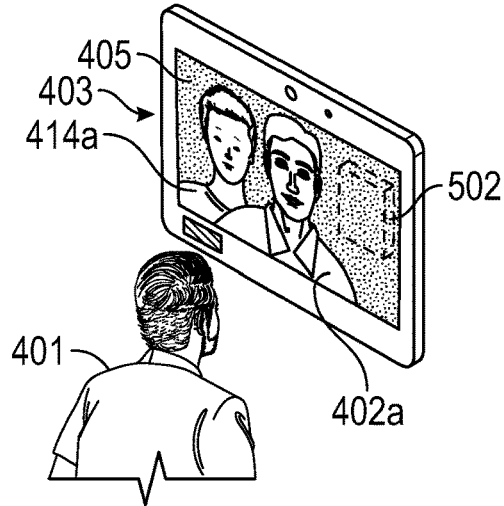
Figure 5C:
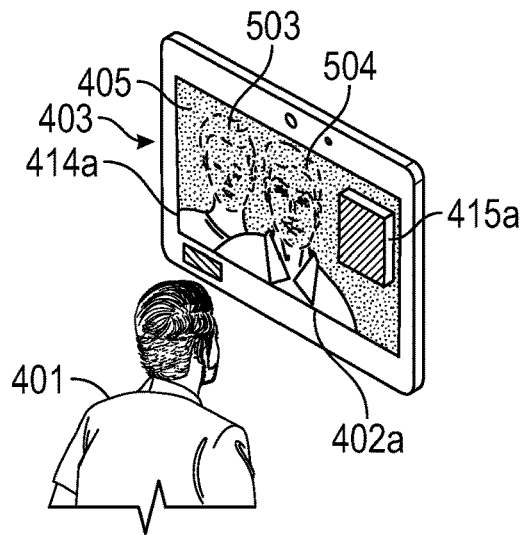

FIGS. 5A-C illustrate various example methods for blurring portions of the display.

Figure 6:
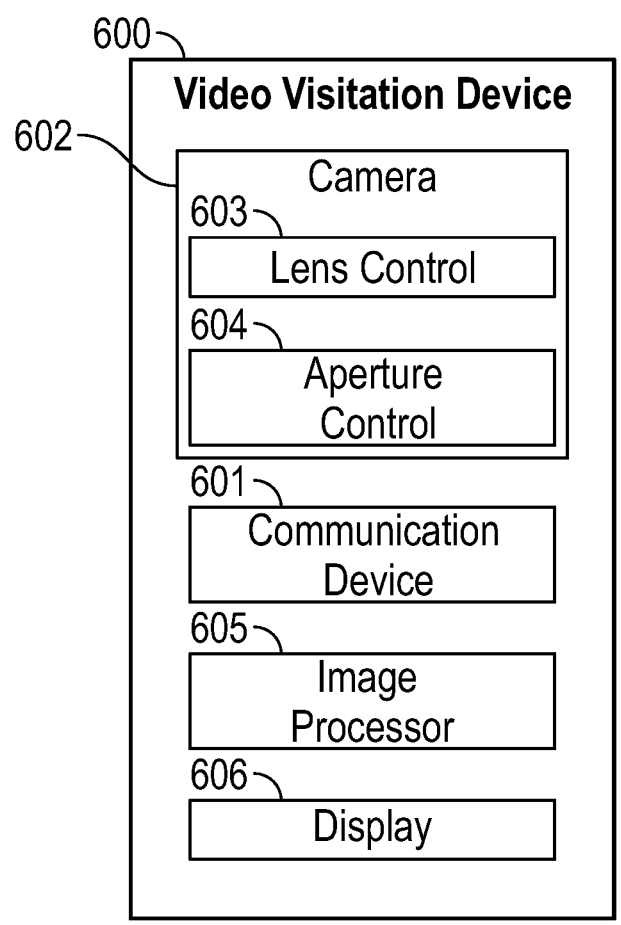

FIG. 6 is a block diagram of hardware or software modules configurable to run on an example video visitation device.

Figure 7:
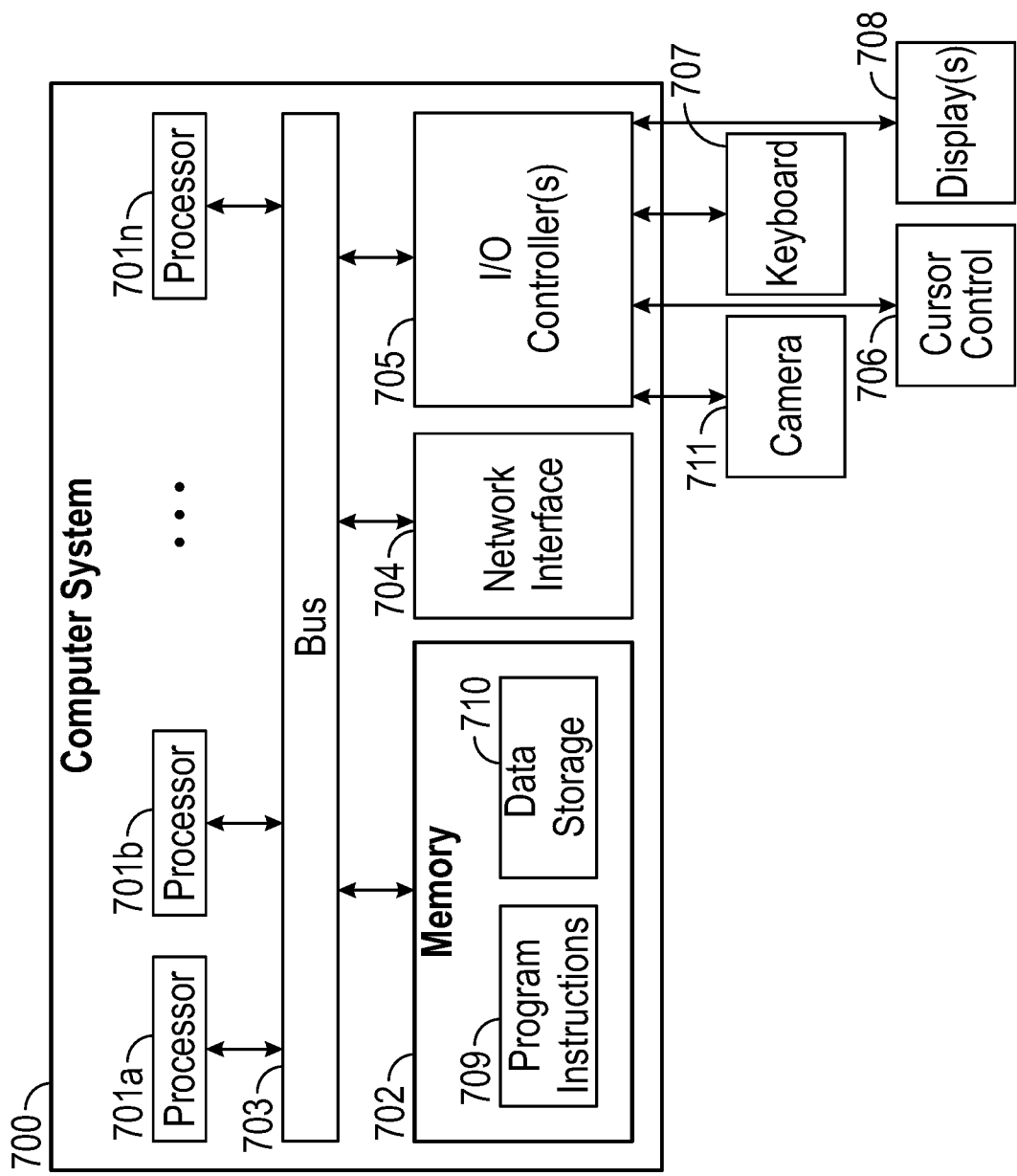

FIG. 7 is a schematic block diagram illustrating one embodiment of a computer system configurable for video blurring in a secure environment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present disclosure relates generally to controlled-environment facilities and, more specifically, to managing the content shown on displays during video communications, such as video calls or video visitation sessions with residents of such facilities. As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers, and counselors in restricted living quarters.

For convenience of explanation, the various examples discussed herein are presented in the context of calls from correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents. Moreover, the systems and methods described herein may be used to manage communications in other facilities that have fewer or no access restrictions and/or involving users who require privacy or discretion during a video communication. Although the example embodiments are directed to video calls, the display control methods disclosed herein are equally applicable to video visitation, video teleconferences, video learning, or other forms of video communication.

FIG. 1 is a diagram of a controlled-environment facility environment 100, wherein example embodiments of systems and methods for managing the content of video visitation display screens may be employed with respect to one or more controlled environment facilities 101, 102. An external, centralized communication processing system 103, an onsite communication processing system 104, or the like may provide telephone services, videoconferencing, online chat, and other communication services to residents of respective controlled-environment facility 101, 102. In some cases, a communication processing system 104 may be co-located with a controlled-environment facility 102. Alternatively, a communication processing system 103 may be centrally or remotely located, in whole or in part, with respect to one or more controlled-environment facilities 101, 102, such as in a controlled-environment facility vendor datacenter 105. The remote system 103 may be connected to facilities 101, 102 via a public or private network 106 (e.g., via a secure tunneling protocol over the Internet, using encapsulation, an intranet, or other type of data network), and may provide communication services to such multiple controlled-environment facilities. More generally, however, it should be noted that communication systems 103, 104 may assume a variety of forms, including telephony switches such as electronic switching systems, or the like, and/or and may be configured to serve a variety of facilities and/or users, whether within or outside of a controlled-environment facility In addition to providing visitation and communication operations, communication processing systems 103, 104 may attempt to ensure that an inmate's electronic communications, such as calls, video conferences, online chats, etc. are performed only with non-residents whose identities, devices, email addresses, phone numbers, etc. are listed in that inmate's Personal Allowed Number (PAN) or Pre-Approved Contact (PAC) list. Each inmate's PAN or PAC list may be stored, for example, in a database maintained by controlled-environment facility vendor datacenter 105 and/or the like. In addition to PAC and/or PAN list(s), controlled-environment facility vendor datacenter 105 and/or the like may also store Resident Profile Data (RPD) as well as communication and/or visitation rules applicable to each resident, Communication Detail Records (CDRs), or similar records, for resident electronic communications, such as phone calls, video visitations, texts, online chats, or the like. The controlled-environment facility vendor datacenter 105 may include information such as balances for resident trust and calling accounts, trial schedules, conviction data, criminal records, and any other information that may be relevant or useful to correctional facility staff to house and maintain residents.

Controlled-environment facility resident account management system 107 may maintain resident accounts to the benefit of the respective resident, such as resident commissary accounts, resident communications accounts, which may be used to pay for purchase of a controlled-environment facility resident communication and/or media devices (e.g., 109, 110, 111, 112), communications, such as phone calls, video visitation, internet chats, emails, text messages, or the like. Account management system 107 may be a separate system or may be a part or function of controlled-environment facility datacenter 105. Other management systems may include public phone companies, cell phone forensics, internet service providers, visitation systems including video and non-video systems, postal services, email services, payment processors and the like.

Residents may use conventional telephones 113, 114, or the like to access certain communication services, under control of respective communication processing system 104, 103. Additionally, or alternatively, a resident may use a video visitation device 115a-115n, 116a-116n, or the like to place voice calls, as well as for video visitation, under control of respective communication processing system 104, 103. Such a video visitation device 115, 116 may be referred to as an Intelligent Facility Device (IFD), which may be a video phone particularly adapted for use in a controlled-environment facility and that may also be used to place voice calls. IFDs may take the form of a voice telephone that has a touchscreen interface. Generally speaking, IFDs may be disposed in a visitation room, in a pod, as part of a kiosk, etc. Additionally, or alternatively, in some facilities, residents may use a personal computer wireless device, such as a smartphone/media player 109, 111, tablet computing device 110, 112, or the like that has been adapted and/or approved for use in a controlled-environment facility. Such a tablet computing device or smartphone/media player may be referred to as an Intelligent Resident Device (IRD) (or in a correctional institution embodiment as an Intelligent Inmate Device (IID)). As will be appreciated, IRD/IIDs, IFDs, or other similar devices, as well as phones 113, 114 have communications capabilities to enable a party to participate in electronic communications, such as telephone calls, video visitation sessions (video calls), or the like, with other call parties, such as non-residents, under control of respective communication processing system 104, 103.

As noted, IRD/IIDs may be tablet computing devices 110, 112 or smartphones/media players 109, 111 that are adapted and/or approved for use by residents of the respective controlled-environment facility 101, 102. Each IRD/IID may be particularly adapted for use in a controlled-environment. For example, in a correctional institution, jail, or the like, such an IRD/IID may be "stripped-down" from the standpoint of what applications programs are provided or allowed on the IRD/IID, and/or connectivity afforded to the IRD/IID. By way of example, such an IRD/IID may employ an operating system kernel that has been rebuilt for use in such a tablet computing device in a controlled-environment facility. For example, such an IRD/IID may be adapted to only connect to a network provided by the controlled-environment facility and/or in only certain locations within the controlled-environment facility. The locations approved for use with an IRD/IID may be controlled by limiting availability of Wi-Fi access to certain areas. Access may be compartmentalized, thereby leveraging the structure of the controlled-environment facility by limiting the availability of Wi-Fi signals through the placement of wireless access points, controlling antenna directionality of such wireless access points, and/or the like.

Also, the IRD/IID may have a number of fixed applications pre-installed on the device. In some embodiments, installation of further applications on the IRD/IID device may be forbidden (i.e. prevented by modifications to the device's operating system, or the like) and/or restricted, such as by requiring permission from a facility administrator. Applications provided on an IRD/IID might include apps of particular interest to residents of the controlled-environment facility. For example, an IRD/IID provided to inmates of correctional facilities, might include apps that may be of particular use to an inmate, in general, such as access to a legal research service, or of more specific interest, such as providing an inmate nearing release, access to employment searching apps or the like. As noted, in accordance with embodiments of the present systems and methods, IRD/IIDs may be used to communicate with others, such as through phone calls, video calls, or the like. To this end such IRD/IIDs 110, 112, 109, 111, etc. may include a preinstalled, non-removable application to facilitate implementation of embodiments of the present systems and methods, and/or to carry out all or certain aspects of embodiments of the present systems and methods.

To access communications services, a resident may initiate telephone services by lifting the receiver on telephone 113, 114, etc. or IFD 115, 116, etc. and/or otherwise initiating an electronic communication, such as by launching a communication application on IRD/IID 110, 112, 109, 111, etc. At which time, the resident may be prompted to provide a personal identification number (PIN), other identifying information or biometrics. An interactive voice response (IVR) unit (not shown, but which may be integrated into communications processing system 104 and/or 103, etc.) may generate and play prompts or other messages to the resident. Under the control of communication processing system 104 and/or 103, etc. the device may be capable of connecting to a non-resident's device (e.g. telephone 117, non-resident computer 118, non-resident tablet computing device 124, non-resident smartphone/media player 125, or the like) across public network 119, such as a publicly switched telephone network (PSTN), an Integrated Services Digital Network (ISDN), Voice-over-IP (VoIP) or packet data network, such as for example the Internet, etc.

Public network 119 may be the same as or different from network 106. Telephony switch 120, 121, etc. in respective communication processing systems 104, 103 may be used to connect calls across public network 119, such as calls from controlled-environment facility telephone 113 or 114 and non-resident telephone 117. A telephony router 122, 123, media gateway, or the like may be used to route data packets associated with a digital call connection, via an Integrated Services Digital Network (ISDN), the Internet, or the like (i.e., network 119). For example, a non-resident party may have a personal or laptop computer 118 with a webcam or devices 124 or 125 may have an integrated camera and display (e.g., a smart phone, tablet, etc.). A network connection between the parties may be established and supported by an organization or commercial service that provides computer services and software for use in video communications. Additionally, or alternatively, the correctional facility and/or the destination may use videoconferencing equipment compatible with any suitable standard, such as ITU H.323, H.802, H.264, and/or V.80. In accordance with various embodiments of the present systems and methods, non-resident telephone 117, computer 118, tablet computing device 124, and/or smartphone/media player 125 may be disposed in the non-resident's home, place of work, on their person. Additionally, or alternatively, the non-resident devices may be disposed in a visitation area of controlled-environment facility 101, 102, etc., which may be within, adjacent to, or remote with respect controlled-environment facility 101, 102 itself.

In other embodiments, a separate visitation system 126 may be configured to provide, schedule, and manage visitation services to residents and non-residents of controlled-environment facilities 101, 102. Visitation system 126 may be coupled directly to a controlled environment facility communication processing system 103 and/or through network 106 or 119 to a remote communication processing system 104. Accordingly, visitation system 126 may be configured to allow residents of the controlled-environment facilities to communicate via devices 109-116 and with one or more non-residents via device 127.

Although visitation system 126 is shown in FIG. 1 as being remotely located with respect to the controlled-environment facilities 101 and 102, visitation system 126 may be co-located with the facility and/or integrated within the communication processing system in other embodiments. Visitation device 127 may be located in a controlled environment facility 101, 102, such as in a visitation area that is available for use by non-residents. For example, friends, family, and attorneys of a resident may visit the facility but not be allowed to meet in person with the resident for security or operational reasons. In such a case, the non-resident may use device 127 to conduct a video communication with a resident on a device 115a-n or 116a-n, for example.

FIG. 2 illustrates an example video visitation device 200, such as an Intelligent Facility Device (IFD) 115, 116 or visitor device 127 as shown in FIG. 1. Video visitation device 200 includes display 201, camera 202, and handset 203 coupled via wire 204. Display 201 may be any suitable electronic display such as a Liquid Crystal Display (LCD), a touchscreen display (e.g., resistive, capacitive, etc.), or the like, whereas camera 202 may be any suitable imaging device such as, for instance, a video camera or webcam equipped with Charge-Coupled Devices (CCDs), Complementary Metal-Oxide-Semiconductor (CMOS) active pixel sensors, etc. Handset 203 may be similar to a traditional telephone handset including an earpiece portion (with a speaker), a handle portion, and a mouthpiece portion (with a microphone).

During a video visitation session, video visitation device 200 may be configured to capture a video image of a user to be transmitted to a remote party using camera 202 and to display a video image of the remote party to the user on display 201. Video visitation device 200 may also be configured to capture an audio signal from the inmate to be transmitted to the non-resident using the mouthpiece portion of handset 203 and to provide an audio signal from the non-resident to the inmate using the earpiece portion of handset 203. Additionally, or alternatively, audio received from the non-resident may be reproduced via loudspeaker 205, and audio provided by the inmate may be captured via microphone 206. In some embodiments, handset holder or holster 207 may be configured to allow a user to securely rest handset 203 against device 200 (e.g., in its "off" position) when device 200 is not in use. Furthermore, handset holder 207 may include a mechanical or electromechanical switch or sensor (not shown) that senses when handset 203 is not resting against it (e.g. in its "on" position).

Video visitation device 200 may also include lighting device 208 and lighting sensor 209. In some embodiments, lighting device 208 may include one or more incandescent light sources (e.g., bulbs, lamps, etc.), fluorescent lamps, Compact Fluorescent Lamps (CFL), Cold Cathode Fluorescent Lamps (CCFL), high-intensity discharge sources, Light-Emitting Diodes (LEDs), or the like. Additionally, or alternatively, lighting device 208 may include one or more adjustable lighting devices with variable intensity, brightness, luminance, color, tone, etc. Lighting or light sensor 209 may include one or more suitable sensors such as, for example, photoresistors, photodiodes, etc. In various implementations, camera 202 may instead serve as a light sensor, and separate light sensor 209 may be absent.

While video visitation device 200 is illustrated in FIG. 2 as a hardened, wall-mounted device, in other embodiments the video visitation devices may take the form of a kiosk or terminal. Furthermore, it should be noted that, outside of correctional facilities, video visitation device 200 may assume the form of any computer, tablet computer, smart phone, etc., or any other consumer device or appliance with videoconferencing capabilities. For example, in the case where video visitation device 200 is a camera-enabled television or smartphone that does not include a dedicated lightning apparatus, the brightness of display 201 may be adjusted so that display 201 may itself act as lighting device 208. For example, the brightness of display 201 may be increased to also increase the illumination of the person "watching" the teleconference upon detection that a video connection has been established.

In one embodiment, the video visitation device 200 may include a keypad 210 or other user input device to allow a user to enter information. For example, the user may dial a telephone number associated with a recipient of a video visitation call, enter an account number for billing purposes, or enter a PIN or inmate number for authentication and/or identification purposes.

Camera 202 on video visitation device 200 may include an image sensor that is configured to capture a sequence of images suitable for generating video. In one embodiment, one or more lenses and/or an aperture mechanism (not shown) may be coupled to the image sensor. For example, the lenses may be used to set a focal length of the camera 202 and the aperture mechanism may be adjusted to adjust the amount of light that passes to the image sensor. The depth of field of the camera 202 may be adjusted by either changing the focal length by adjusting the lenses or by adjusting the aperture size. In general, the ratio of the focal length set by the lenses to the aperture size is referred to as the f-stop or relative aperture of the camera system. The depth of field is the distance between the nearest and farthest objects in a scene that appear acceptably sharp in an image. The depth of field may be manipulated by adjustment of the f-stop of the camera system 202 or through digital processing techniques.

In such an embodiment, the depth of field of the camera system 202 may be adjusted such that a first object positioned at a first distance from the camera 202 may be in focus, while a second image positioned at a second distance or greater may be blurred. The lenses and/or the aperture mechanism may be adjusted to increase or decrease the depth of field of the camera system such that both the first object and the second object are in focus at a first setting, or such that only the first object is in focus at a second setting, or such that only the second object is in focus at a third setting. Systems and methods for blurring images based upon distance from the camera are disclosed in U.S. Pat. No. 9,083,850, the disclosure of which is incorporated by reference herein in its entirety. In other embodiments digital processing of the video signal may be used to blur or obscure some or all of the image captured by camera 202.

FIG. 3 illustrates an example video visitation device 300, such as an Intelligent Resident Device/Intelligent Inmate Device (IRD/IID) 109-112 as shown in FIG. 1. As noted above, the video visitation device 300 may take the form of a tablet computing device that is adapted, or otherwise approved, for use in a controlled-environment facility. Video visitation device 300 has video communication capabilities to enable a user to participate in video communication sessions with other parties, such as non-residents of the controlled-environment facility. Video visitation device 300 (which may be an IRD/IID) includes a screen 301 one or more hardware buttons 302, a camera 303, microphone 304, and one or more speakers 305. A resident may participate in a telephone call or a video communication using a calling or video communication application 306. Camera 303 may be capable of capturing an image of the user and microphone 304 captures the user's speech. Lighting of the user during a video communication may be accomplished using visible light from light 307. Alternatively, or additionally, a second light source 308 (such as illustrated around camera 303) may provide lighting.

In accordance with some embodiments of the present systems and methods, the Operating System (OS) of video visitation device 300 may transmit a request to enable its camera to the controlled-environment facility electronic communications processing system 103, 104 when an operation for using camera 303 is detected (such as initiation of a video visitation session using application 306). As discussed with respect to device 200, a series of lenses and/or an aperture mechanism associated with camera 303 may be adjusted to increase or decrease the depth of field for the camera system. The lenses and/or aperture mechanism may be adjusted to focus or blur certain portions of the video captured by camera 303. Alternatively, a video visitation device 300 may digitally process a captured or received image and modify the level of focus and blurring in a displayed image 309.

In addition to hardware button 302, video visitation device 300 may have other physical buttons or switches 310 that can be used to provide inputs and to make selections on display 301. The application 306 may also provide soft buttons or inputs such as a keypad 311 on a touchscreen display 301. In one embodiment, application 306 provides inputs 312 and 313 on touchscreen display 301, which allow the user to select blurring of the outgoing or incoming images, respectively. When selected, button 312 would cause images captured by camera 303 to be blurred entirely or in part before being transmitted to a remote user. Similarly, button 313 allows the user to blur the incoming image, which would cause all or part of the displayed image 309 to be blurred. Alternatively, blurring of the display may be triggered by a verbal command by either participant.

Other configurations, such as hardware buttons 302 and 310 or keypad 311, may be used to select or deselect the blurring functionality. The operation of buttons 312 and 313 may be predetermined by application 306 or may be configured by the user. The blurring operation may be toggled on/off by sequentially pressing buttons 312, 313. Alternatively, the blurring function is applied only while the buttons 312, 313 are pressed so that the system returns to normal operation when the buttons 312, 313 are released. In a further embodiment, the blurring may be applied for a preset duration after a button 312, 313 is pushed. The area selected for blurring may be predetermined by application 306 or may be configured by the user. For example, the user may select to have all of the image blurred or to blur the background or only static objects.

FIG. 4 is simplified block diagram illustrating two individuals 401, 402 participating in a video communication session. Participant 401 uses video communication device 403, and participant 402 uses video communication device 404. Although shown as tablet computer devices in FIG. 4, it will be understood that devices 403, 404 may be any appropriate device, such as, for example, a laptop, desktop computer, smartphone, or a specialized video communication terminal, kiosk, or workstation. Devices 403, 404 may be the same or different types of devices. Generally, devices 403, 404 have a screen 405, 406 that displays video or still images captured by a camera 407, 408 on the other device. During a video conferencing session, for example, an image 402a of participant 402 is displayed to user 401 on device 403. Similarly, an image 401a of participant 401 is displayed to user 402 on device 404. Audio is captured via microphones 409 on each device, and then broadcast to the participant on the other device over speaker 410.

The video communication session may be controlled by applications running on each device 403, 404. Video conferencing data is exchanged through one or more networks 411 that are in communication with devices 403, 404. A video communication server 412 may be used to facilitate setting up, initiating, and managing video conference sessions. Video communication server 412 may be centrally located or may be co-located with one of participant devices 401, 402. Each participant 401, 402 and their respective device 403, 404 may be located anywhere that provides access to network 411, which may be near to or remote from the other participant. In a typical video conference, an initiating participant 401 at device 403 calls the other participant 402's device 404 and, therefore, knows which device 404 is connected to the session.

In an example embodiment, the initiating device 403 is located at a controlled environment facility and is used by a facility resident 401. In such cases, the network 411 and video communication server 412 may correspond to one or more of communication processing system 103, 104, network 106, visitation system 126, and other components of the system illustrated in FIG. 1. In other embodiments, neither user 401 or 402 are located in a controlled environment facility and network 411 may be, for example, one or more of a wireless carrier network, landline telephone network, the Internet, an intranet, a wireless or wired Local Area Network (LAN), an enterprise network, and the like.

When using video communication devices 403, 404, participants 401, 402 may not be able to maintain privacy. For example, other individuals 413, 414 may be within the field of view of cameras 407, 408, which will result in their respective images 413a, 414a being displayed on devices 403, 404. In the context of a controlled environment facility example, a first resident 401 uses device 403 during a video visitation session with a first non-resident 402 on device 404. Resident 401 may initiate the video communication if, for example, non-resident 402 is on the resident's PAN list. If resident 401 initiates the communication from a dormitory or pod, it is likely that one or more second residents 413 will be present during the session. A second resident 413 may be positioned generally near or behind first resident 401, which allows second resident 413 to view display 405. This positioning also allows camera 407 to capture images of second resident 413 so that both residents 401 and 413 are shown (401a, 413a) to non-resident 402 on screen 406 of device 404.

Similarly, a second non-resident 414 may be positioned near first non-resident 401 and within the view of camera 408. This allows images of both non-residents 402 and 414 to be captured and presented (402a, 414a) on screen 405 of device 403. In addition to capturing images of people in the background, cameras 407, 408 may also capture images of objects, such as a picture 415, that are behind non-resident 402. Object 415 is also displayed (415a) to resident 401 on device 403.

The display of second non-resident 414 and object 415 to resident 401 may be intentional or unintentional on behalf of first non-resident 402. In some cases, the second non-resident 414 may be an active participant in the communication. In other cases, the second non-resident 414 may be shown to resident 401 unintentionally if, for example, they are passing behind non-resident 402 or happen to be in the same room during the communication.

In one embodiment, first non-resident 402 has the capability to blur all or part of display 405 on remote device 403. For example, if first non-resident 402 does not want second non-resident 414 and/or background object 415 to be visible on display 405, then first non-resident 402 may select an input on device 404 to cause the background image to be blurred or otherwise obscured. The video signal captured by camera 408 may be modified before transmission so that only the foreground including non-resident 402 is displayed on device 403. Alternatively, an unmodified video signal may be transmitted to device 403 along with a command to modify the image displayed at device 403.

In another embodiment, first resident 401 has the capability to blur all or part of display 405 on his own device 403. For example, if first resident 401 does not want the second non-resident 414 and/or the background object 415 to be visible on display 405, then first resident 401 may select an input or command on device 403 to cause the background image to be blurred. The unaltered video signal received from device 404 may be modified before display on screen 405 so that only the foreground including non-resident 402 is displayed on device 403.

There may be numerous reasons for either party 401 or 402 to want to blur the display 405 on device 403. For example, either party 401 or 402 may blur display 405 if there is a risk that second resident 413 is eavesdropping on the video communication. Alternatively, if resident 401 does not want to expose the identities of non-residents 402 and/or 414 to second resident 413, then first resident 401 may cause all or part of screen 405 to be blurred. Similarly, if either first resident 401 or first non-resident 402 do not want object 415 to be seen by the second resident 413, then either party 401, 402 may cause the background to be blurred on display 405. This may prevent second resident 413 from targeting non-residents 402, 414 and object 415 for illegal activity, such as intimidation, threats, theft, etc.

Either party 401, 402 may also select to blur images captured by camera 407 so that all or part of the image is obscured when shown on display 406 at device 404. This may be useful, for example, to prevent non-residents 402, 414 from seeing offensive, rude, threatening, or other gestures made by second resident 413.

FIGS. 5A-C illustrate various example methods for blurring portions of the display 405 on device 403 (FIG. 4). In FIG. 5A, the entire background 501 area on display 403 has been blurred, which leaves only the non-resident image 402a shown on the display. When blurring the background images, such as non-resident 414a and object 415a, those images may be completely obscured or may be displayed out-of-focus to a degree that any details are unrecognizable.

In FIG. 5B, the system is configured to blur static objects, so that object 415 is obscured 502 and not displayed. However, both the images of both non-residents 402a, 414a are shown in the display 403 since they are moving during the communication.

In FIG. 5C, the faces on the non-resident images 402a, 414a are blurred. This blurring may be applied, for example, to hide the identities of the non-residents 402 and 414. Blurring 503 is applied to the face of image 414a, and blurring 504 is applied to the face of image 402a. However, other background items and/or people, such as the image of object 415a, may be shown.

In other embodiments, the entire display 405 may be blurred, which would prevent an eavesdropping resident from seeing any part of the video communication with resident 401. In an alternative embodiment, different images on display 405 may be blurred or obscured to different degrees. For example, background objects, such as item 415a, may be completely obscured so that it is not visible on display 405, while faces on images of non-residents 402a and 414a are rendered as out-of-focus images so that it is clear that the images are of people, but the individuals are not recognizable.

The blurring effect may be triggered manually, such as by using a blur-image button 312, 313 (FIG. 3). Alternatively, blurring may be triggered automatically by the content on display 405 and/or by events around the user 401 based upon a set of blurring rules applied to the display content. For example, the blurring effect may be automatically applied to display 405 if nudity is detected or if either non-resident 402a, 414a is identified as a child or is likely to be a minor. Display 405 might be automatically blurred if more than one person appears in the screen 405, such as automatically blurring non-resident 414a when he walks into view. If the resident's device detects more than one face in the outgoing display (i.e., another resident in the background or two residents on the call), then some or all of the display 405 may be automatically blurred so that the second resident is unable to view the displayed content.

Alerts and notifications may be sent when blurring is enabled, triggered, and/or applied to a video device. For example, a non-resident 402 may be notified when their image 402a is being blurred on display 405 of the resident device 403. Such notification may take the form of a pop-up text box or other notification on display 406 at device 404 when blurring is manually or automatically triggered at device 403. This notification may indicate that blurring has been applied for safety or privacy to give non-resident 402 some level of comfort that other residents 412, etc. cannot see them.

Facility staff may also be alerted or notified when blurring occurs. Such staff alerts may be issued in real-time so that the video communication may be monitored to ensure that unacceptable conduct is not occurring. Alternatively, instances of blurring may be marked in a recorded file of the video communication so that facility staff may review the communication at a later date or time and determine if the blurring was triggered by inappropriate or unacceptable behavior, for example. The facility staff may view the recorded video communication with or without the blurring. For example, the recorded video would comprise an intact copy of the communication without blurring but may include indications of when blurring started and stopped and what portions of the display were blurred.

FIG. 6 is a block diagram of hardware or software modules configurable to run on a video visitation device 600. A communication device 601 may be configured to communicate video to a video communication server 412, such as a communication processing system 103, 104 or a visitation system 126. The communication device 601 may send or receive video control commands from the video communication server 412. For example, a camera controller on the video communication server 412 may issue a command to blur a background portion of video captured by camera 602. The communication device 601 may receive the command and relay it to the camera 602. The camera 602 may include a lens control 603 configured to adjust the focal length of the camera lenses. Additionally, the camera 602 may include an aperture control 604 configured to adjust an aperture diameter of an aperture mechanism. Accordingly, through adjustment of the focal length and or the aperture, the depth of field of the camera system 602 may be adjusted, thereby blurring some objects in the image while keeping other objects in focus.

In addition to modifying the image using depth of field adjustments, an image processor 605 may be used to modify certain parameters of video received from the video communication server 411 or a remote video visitation device 103 such that portions of the video frames are blurred. In one embodiment, certain sets of frames associated with video captured by camera 602 may be blurred, obscured, masked, or censored before sending the video to the remote device. In another embodiment, a background portion of received video frames from the remote device may be blurred, obscured, masked, or censored before being shown on display 606.

The image processor 605 may blur the image according to a blurring factor which may be preset or set by a user. The blurring factor may be a setting used to determine how much objects in the video will be blurred or obscured, such as a degree of distortion or transparency applied to the image or video frames. In one embodiment, the image processor 605 may apply a simulated background, bokeh, or out-of-focus effect to portions of video frames by modifying individual pixels in the portions of the image that are to be obscured. Such modification can be achieved, for example, by applying a low-pass filter to selected portions of the image.

FIG. 7 is a schematic block diagram illustrating one embodiment of a computer system 700 configurable for video blurring in a secure environment. In one embodiment, a video visitation device 115, 116, 127, 200, 300, 403, 404 and/or video communication server 412 may be implemented on a computer system similar to the computer system 700. Similarly, remote devices, such as telephone 117, computer 118, tablet computing device 124, smartphone/media player 125 may be implemented on a computer system similar to the computer system 700. In various embodiments, computer system 700 may be a server, a mainframe computer system, a workstation, a network computer, a desktop computer, a laptop, or the like.

As illustrated, computer system 700 includes one or more processors 701A-N coupled to a system memory 702 via bus 703. Computer system 700 further includes network interface 704 coupled to bus 703, and input/output (I/O) controller(s) 705, coupled to devices such as cursor control device 706, keyboard 707, and display(s) 708. In one embodiment, the I/O controller(s) 705 may be coupled to a camera 711. In some embodiments, a given entity (e.g., a video visitation device) may be implemented using a single instance of computer system 700, while in other embodiments multiple such systems, or multiple nodes making up computer system 700, may be configured to host different portions or instances of embodiments (e.g., video communication server 412).

In various embodiments, computer system 700 may be a single-processor system including one processor 701A, or a multi-processor system including two or more processors 701A-N (e.g., two, four, eight, or another suitable number). Processor(s) 701A-N may be any processor capable of executing program instructions. For example, in various embodiments, processor(s) 701A-N may be general-purpose or embedded processors implementing any of a variety of instruction set architectures (ISAs), such as the x86, POWERPC®, ARM®, SPARC®, or MIPS® ISAs, DSP's (digital signal processor) or any other suitable ISA. In multi-processor systems, each of processor(s) 701A-N may commonly, but not necessarily, implement the same ISA. Also, in some embodiments, at least one processor(s) 701A-N may be a graphics processing unit (GPU) or other dedicated graphics-rendering device.

System memory 702 may be configured to store program instructions and/or data accessible by processor(s) 701A-N. For example, memory 702 may be used to store software programs. In various embodiments, system memory 702 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 702 as program instructions 709 and data storage 710, respectively. In other embodiments, program instructions and/or data may be received, sent, or stored upon different types of computer-accessible media or on similar media separate from system memory 702 or computer system 700. Generally speaking, a computer-accessible medium may include any tangible, non-transitory storage media or memory media such as electronic, magnetic, or optical media—e.g., disk or CD/DVD-ROM coupled to computer system 700 via bus 703, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 703 may be configured to coordinate I/O traffic between processor 701, system memory 702, and any peripheral devices including network interface 704 or other peripheral interfaces, connected via I/O controller(s) 705. In some embodiments, bus 703 may perform any necessary protocol, timing, or other data transformations to convert data signals from one component (e.g., system memory 702) into a format suitable for use by another component (e.g., processor(s) 701A-N). In some embodiments, bus 703 may include support for devices attached through various types of peripheral buses, such as a variant of the Peripheral Component Interconnect (PCI) bus standard or the Universal Serial Bus (USB) standard, for example. In some embodiments, the operations of bus 703 may be split into two or more separate components, such as a north bridge and a south bridge, for example. In addition, in some embodiments some or all of the operations of bus 703, such as an interface to system memory 702, may be incorporated directly into processor(s) 701A-N.

Network interface 704 may be configured to allow data to be exchanged between computer system 700 and other devices, such as other computer systems attached to visitation system 130, for example. In various embodiments, network interface 704 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 705 may, in some embodiments, enable connection to one or more display terminals, keyboards, keypads, touch screens, scanning devices, voice, camera, or optical recognition devices, or any other devices suitable for entering or retrieving data by one or more computer system 700. Multiple input/output devices may be present in computer system 700 or may be distributed on various nodes of computer system 700. In some embodiments, similar I/O devices may be separate from computer system 700 and may interact with computer system 700 through a wired or wireless connection, such as over network interface 704.

As shown in FIG. 7, memory 702 may include program instructions 709, configured to implement certain embodiments described herein, and data storage 710, comprising various data accessible by program instructions 709. In an embodiment, program instructions 709 may include software elements of embodiments illustrated in FIG. 6. For example, program instructions 709 may be implemented in various embodiments using any desired programming language, scripting language, or combination of programming languages and/or scripting languages. Data storage 710 may include data that may be used in these embodiments. In other embodiments, other or different software elements and data may be included.

A person of ordinary skill in the art will appreciate that computer system 700 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

In one embodiment, the elements described herein may be implemented in discrete hardware modules. Alternatively, the elements may be implemented in software-defined modules which are executable by one or more of processors 701A-N, for example.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for managing a display on a video communication device, comprising:
   establishing a video communication session to a remote device;
   receiving a video signal from the remote device;
   showing images from the video signal on the display;
   receiving a blur command from a user of the video communication device; and
   blurring at least a portion of the images on the display.

2. The method of claim 1, wherein blurring at least a portion of the images comprises:
   blurring one or more objects in a background of the images.

3. The method of claim 1, wherein blurring at least a portion of the images comprises:
   blurring one or more faces in the images.

4. The method of claim 1, wherein blurring at least a portion of the images comprises:
   blurring static background objects in the images.

5. The method of claim 1, wherein the blur command is entered by the user of the video communication device using a physical button on the video communication device or by the user of the video communication device using a button displayed on a touchscreen display on the video communication device.

6. The method of claim 1, further comprising:
   stopping the blurring of the at least a portion of the images after a predetermined duration.

7. The method of claim 1, further comprising:
   receiving a stop-blur command from the user of the video communication device; and
   stopping the blurring of the at least a portion of the images in response to the stop-blur command.

8. The method of claim 1, further comprising:
   receiving a blur command from the remote device; and
   blurring at least a portion of the images on the display in response to the blur command from the remote device.

9. The method of claim 1, further comprising:
   sending a blur request to the remote device, wherein the blur request causes the remote device to adjust a depth of field parameter for the video signal, such that images of a first object at a first distance from the remote device are in focus and images of a second object at a second distance from the remote device are blurred.

10. A system, comprising:
    a video communication device configured to receive video data from a remote device;
    a screen configured to display the received video data;
    a data storage device coupled to the video communication device and configured to store the received video data; and
    a data processor configured to modify at least a portion of received video data so that an image represented by the received video data is blurred when displayed on the screen.

11. The system of claim 10, wherein the video communication device is located in a secure environment, and wherein the remote device is located outside the secure environment.

12. The system of claim 10, wherein the data processor is configured to modify the received video data upon receiving a blur command from a user of the video communication device.

13. The system of claim 10, wherein the data processor is configured to modify at least a portion of the image by blurring one or more objects in a background of the image.

14. The system of claim 10, wherein the data processor is configured to modify at least a portion of the image by blurring one or more faces in the image.

15. The system of claim 10, wherein the data processor is configured to modify at least a portion of the image by blurring static background objects in the image.

16. The system of claim 10, wherein the data processor is further configured to stop blurring of the at least a portion of the image after a predetermined duration.

17. The system of claim 10, wherein the data processor is further configured to receive a stop-blur command from a user of the video communication device and to stop blurring of the at least a portion of the image in response to the stop-blur command.

18. The system of claim 10, wherein the data processor is further configured to receive a blur command from the remote device and to blur at least a portion of the image on the display in response to the blur command from the remote device.

19. The system of claim 10, further comprising:
a transmitter configured to send a blur request to the remote device, wherein the blur request causes the remote device to adjust a depth of field parameter for the video signal, such that image of a first object at a first distance from the remote device are in focus and images of a second object at a second distance from the remote device are blurred.

20. A non-transitory medium having program instructions stored thereon that, upon execution by a video communications device, cause the video communications device to:
 establish a video communication session to a remote device;
 receive a video signal from the remote device;
 show images from the video signal on a display of the video communications device;
 receive a blur command from a user of the video communication device; and
 blur at least a portion of the images on the display.

* * * * *